Jan. 20, 1942. H. T. KRAFT 2,270,313
THERAPEUTIC METHOD AND APPARATUS
Filed June 13, 1938 6 Sheets-Sheet 1

INVENTOR
*Herman T. Kraft*
BY *Evans & McCoy*
ATTORNEYS

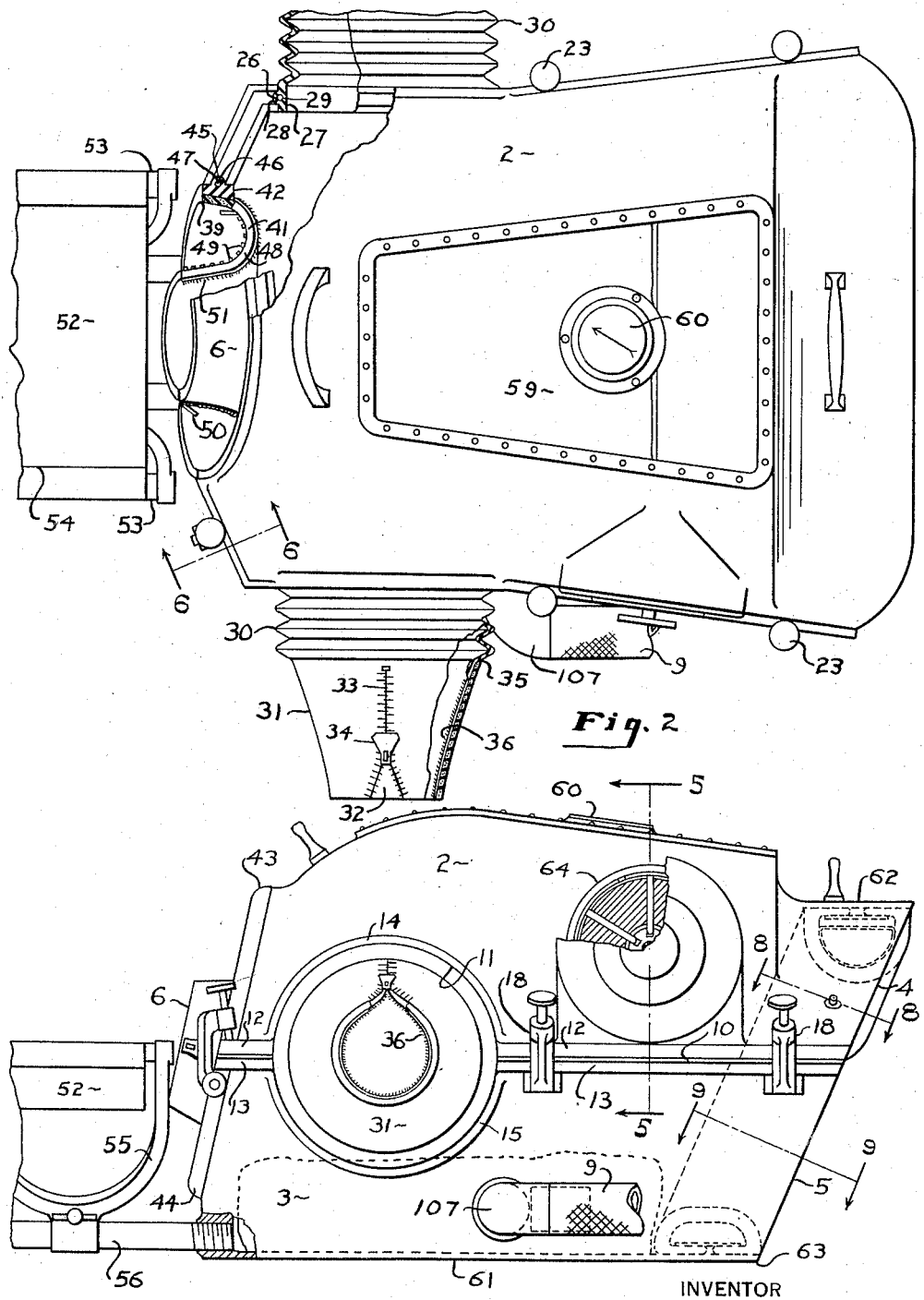

Jan. 20, 1942. H. T. KRAFT 2,270,313
THERAPEUTIC METHOD AND APPARATUS
Filed June 13, 1938 6 Sheets-Sheet 3

INVENTOR
Herman T. Kraft
BY Evans & Wiley
ATTORNEYS

Jan. 20, 1942.    H. T. KRAFT    2,270,313
THERAPEUTIC METHOD AND APPARATUS
Filed June 13, 1938    6 Sheets-Sheet 5

INVENTOR
Herman T. Kraft
BY Evans & McCoy
ATTORNEYS

INVENTOR
Herman T. Kraft
BY Evans & McCoy
ATTORNEYS

Patented Jan. 20, 1942

2,270,313

UNITED STATES PATENT OFFICE 2,270,313

THERAPEUTIC METHOD AND APPARATUS

Herman T. Kraft, Akron, Ohio, assignor to The General Tire & Rubber Company, Akron, Ohio, a corporation of Ohio Application June 13, 1938, Serial No. 213,330

17 Claims. (Cl. 128—30)

This invention relates to therapeutic apparatus for producing alternations of pressure on a part or member of a patient undergoing treatment, and more particularly to an apparatus and method for producing artificial respiration in a patient by subjecting the patient's body or torso to alternations of positive and negative pressure.

It is an object of the invention to provide a respirator of this character which encloses only part of an individual, leaving arms and other members free for useful movement.

Another object is to provide improved sealing means for the arm and neck openings in a therapeutic device of this character which means are adjustable as to size and effect a substantially airtight seal while permitting limited movement of the member encircled thereby.

Another object is to provide a body-enclosing respirator which can be used on persons of different size with a minimum of adjustment and regulation.

Another object is to provide a respirator which induces movements to a patient's torso and lungs, which simulate natural breathing.

A more specific object is to provide pump means for evacuating air from or forcing air into the body-enclosing respirator chamber having means for adjusting the rate and quantity of air displaced.

Another object is to provide an air pump for vascular therapeutic devices which has means for both motor driven and manual operation and is designed for a quick change from one type of operation to the other so that the pumping action may be substantially continuous during change from manual to motor driven operation, or vice versa.

Another object is to provide apparatus of the character mentioned, which is simple in design and construction and relatively inexpensive to manufacture. Other objects and advantages will become apparent from the following detailed description made in connection with the accompanying drawings, in which—

Fig. 2 is a front or top view, partly in section and with parts removed, of the body-enclosing unit or cuirass of the respirator;

Fig. 3 is a side view of the unit shown in Fig. 2 with parts broken away and with parts removed;

Figure 1:
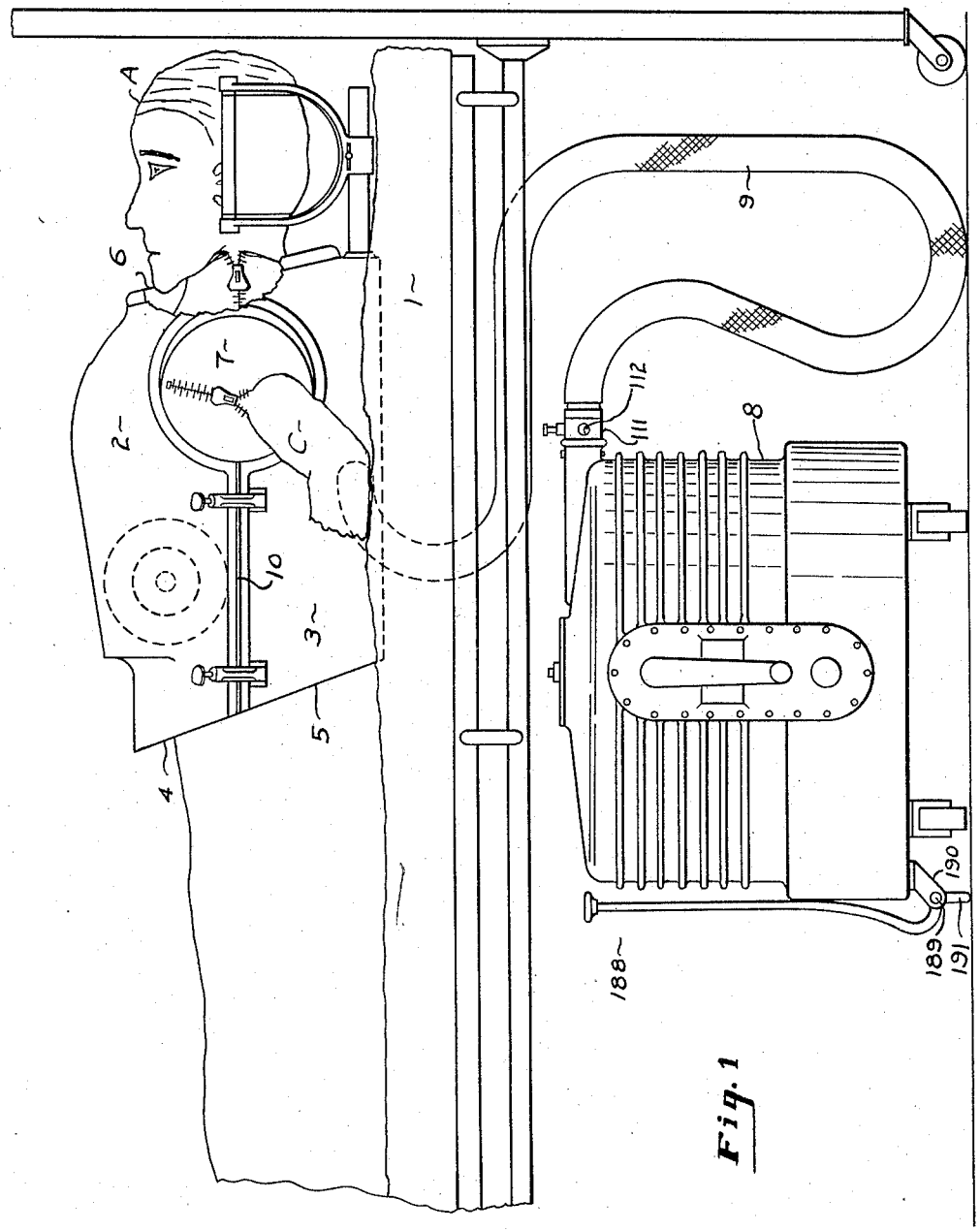
Figure 1 is an elevational view partly in section and with parts removed showing one manner of using a torso-actuating respirator embodying the invention.
Figure 4:
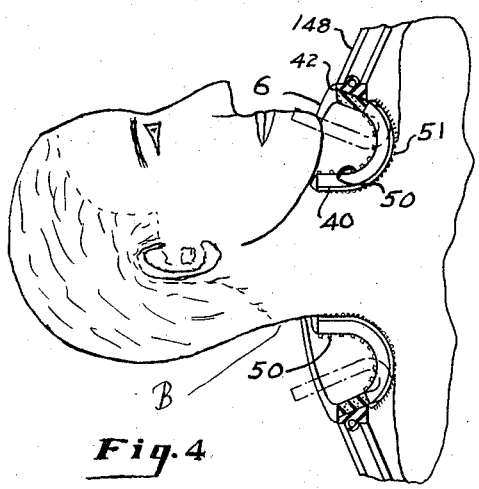
Fig. 4 is a fragmentary detail in section and with parts removed showing the collar of the body-enclosing unit.

In the drawings, like parts throughout the several views are indicated by the same numerals of reference and letters of reference alike throughout the views and are employed to indicate the members of a patient being treated by the apparatus. The general arrangement of the elements of the respirator are shown in Fig. 1 in which a patient is shown wearing the body-enclosing unit or cuirass of the respirator while reclining on a bed 1. In describing the cuirass or body case the parts thereof will be identified by their relation to a person or patient wearing the unit. For example, the shell of the body-enclosing unit is made of separable halves 2 and 3. The front half 2 covers the chest or ventral region of the patient, while the rear half 3 covers the back or dorsal region of the patient's body. Bottom ends 4 and 5 of the casing halves 2 and 3 respectively encircle the waist of the patient just above the hips, effecting a sufficiently airtight seal therewith, in a manner to be later described, and the patient's head A extends through an opening at the top of the casing through a collar to be later described which effects a sufficiently airtight seal around neck B of the patient. The patient's arms C extend through shoulder openings in the top sides of the casing and are embraced by sleeves 7 which effect a substantially airtight seal.

Air is forced into and drawn out of the cuirass or body-enclosing unit of the respirator by means of a pump enclosed in a shell 8. As shown in Fig. 1, the pump is of a size such that it may be disposed underneath the bed 1 on which the patient reclines and is connected to the body casing by means of a flexible conduit or hose 9 similar to that commonly used for vacuum cleaners and the like.

Figures 5, 6:
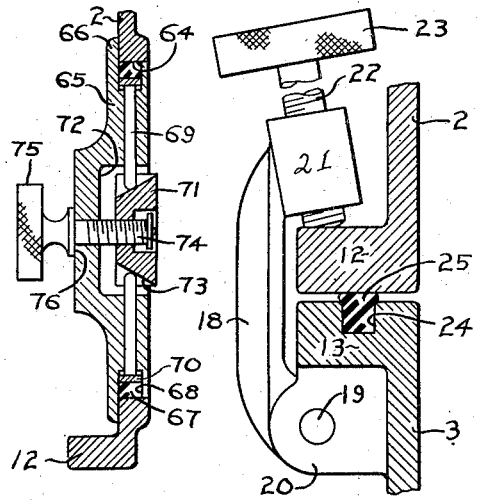
Fig. 5 is a sectional detail view showing the construction of the removable cover for the hand hole, or port, taken substantially on the line 5—5 of Fig. 3 and enlarged with respect thereto.
Fig. 6 is a sectional detail showing the yieldable sealing means between the front and back halves of the cuirass and the clamp for holding the halves together, taken substantially on the line 6—6 of Fig. 2 and enlarged with respect to that figure.

The casing halves 2 and 3 are preferably formed of a rigid material, which may be a light but strong metal such as aluminum and its alloys, and meet one another at parting line 10 which extends along the sides of the casing. At the shoulder region of the cuirass, circular openings 11 are formed at the sides thereof partly in the front half 2 and partly in the rear half 3. Along the side marginal edges of the halves 2 and 3 are formed thickened beads or flanges 12 and 13, respectively, which are disposed in abutting relation at the parting line 10 as shown in Fig. 6. Around the arm holes 11 semicircular beads or flanges 14 and 15 are formed on the casing halves 2 and 3 respectively. The flanges or beads 12 and 14 of the front half 2 are continuous with one another and the flanges 13 and 15 of the bottom half 3 are also continuous with one another as shown in Fig. 3.

Link members 18, which resemble C-clamps secure the casing halves together. The members 18 are pivoted at 19 to bosses 20 formed on the casing 3 adjacent the beads 13. The ends of the members 18 opposite the pivots 19 are formed with bosses 21 which threadedly receive tightening studs 22 provided with knurled thumb wheels 23. As shown in Fig. 6, the axis of each of the studs 22 is at an acute angle with respect to the member 18. The end of each stud opposite the thumb wheel 23 engages one of the flanges 12 so as to press it toward the opposed flange 13. Preferably each of the flanges 13 is formed with a longitudinally extending rabbet 24 which receives a packing material 25 such as rubber which normally extends slightly above the surface of the flange 13 at the parting line 10 so as to be slightly compressed by the opposed flange 12 when the casing halves are set together.

Circumferential rabbets 26 which may be semicircular in cross-section are formed in the inwardly directed faces of the beads or flanges 14 and 15 which define the armholes 11. The sleeves 7 have annular holding bands 27, preferably formed of a suitable relatively stiff rubber composition, which are received between the flanges 14 and 15 within the arm openings 11. Beads 28 which are preferably substantially circumferential in extent are integrally formed on the bands 27 and seat in the circular rabbets 26 formed in the casing armhole flanges 14 and 15. Preferably the bands 27 and beads 28 are reinforced by circular wires or elements 29 of rigid material such as iron or steel, which are embedded therein. Accordingly, when the bands 27 of the sleeves 7 are embraced by the flanges 14 and 15 of the casing, the beads 28 seat in the rabbets 26 to prevent dislodgment of the sleeves and there is a slight squeezing action exerted circumferentially on the bands 27 to effect an airtight seal with the casing.

Formed integrally with each of the bands 27 is a flexible portion 30, preferably constructed like a bellows having bands of alternately increasing and decreasing diameter. At the end of the flexible portion 30 is formed a tapering or conical cuff 31 which is preferably formed of a relatively soft composition, such as sponge rubber. This cup has longitudinal or axially extending slots 32, the edges of which are provided with fasteners 33 arranged to be progressively drawn together and secured by a slide fastener 34.

The large diameter ends of the cuffs 31 are secured at 35 to the ends of the flexible portions 30 of the sleeves 7 in any well known manner, such as by cement or vulcanization. The fasteners 33 and slide fasteners 34 are arranged so that as the latter moves toward the small diameter end of the cuffs 31 the slots 32 are progressively drawn together and as the slide fasteners move away from the small diameter ends of the cuffs the slots 32 progressively open. In this manner the effective size of the openings through the cuffs may be adjusted to arms of different size, so that a number of patients can use the same cabinet or casing without changing the sleeves 7. Preferably the inside surfaces of the cuffs 31 are covered with a material of somewhat porous or fibrous nature such as closely shorn lambs' skin or wool 36, so that the skin of a person in the cabinet is not in continuous contact with the rubber.

The collar 6 is formed of a suitable soft cushioning material such as sponge rubber and is of a generally bowl shape, having an outer annular portion or bowl 39 and an inner annular portion or band 40 which embraces the neck B of the patient. The outer and inner portions are joined by a radially curved portion 41 having its convex side directed toward the interior of the cabinet. In order to accommodate different neck sizes the inner band portion 40 is tapered or conical and has the small diameter end directed upwardly toward the outside of the torso-enclosing cabinet of the respirator. The outwardly directed marginal edge of the outer annular portion 39 is secured by cement or vulcanization to the inside of a holding band 42 formed of relatively stiff rubber. The holding band 42 is embraced by the inwardly directed cylindrical wall of a circular neck opening formed in the top end of the casing halves 2 and 3. This opening is similar to the openings 11 for the arms of the patient and is defined by semicircular flanges 43 and 44 formed on the casing halves 2 and 3 respectively and which are continuous with the flanges 12 and 13. An annular bead 45 integrally formed on the holding band 42 is received in an annular rabbet 46 formed in the faces of the flanges 43 and 44 to retain the collar 6 in position. An inextensible reinforcing element 47, such as an annular wire or rod, is molded into the bead 45 and band 42 to prevent dislodgment of the collar from the neck opening of the cabinet.

Radially extending slots 48, substantially diametrically opposed to one another, are formed through the inner band 40 and radially curved portion 41 of the collar 6. Each of the slots has its edges provided with fasteners 49 which are arranged to be progressively drawn together, in the manner of the edges of the cuff slots 32, by slide fasteners 50 moved radially inward toward the center and then toward the small end of the inner band 40 of the collar. Preferably, the inside surface of the collar 6 is covered with a porous or fibrous material such as lambs' wool 51 which permits limited circulation of air around the neck B of the patient.

A flexible head rest 52 formed of leather or the like is supported at the top or head end of the cabinet by a pair of spaced parallel rods 53 which pass through hems 54 in opposite marginal edges of the head rest. The ends of the rods 53 are carried by yokes 55 adjustably and pivotally mounted on bars 56 threadedly secured into the top ends of the casing half 3 behind the neck opening.

Figure 7:
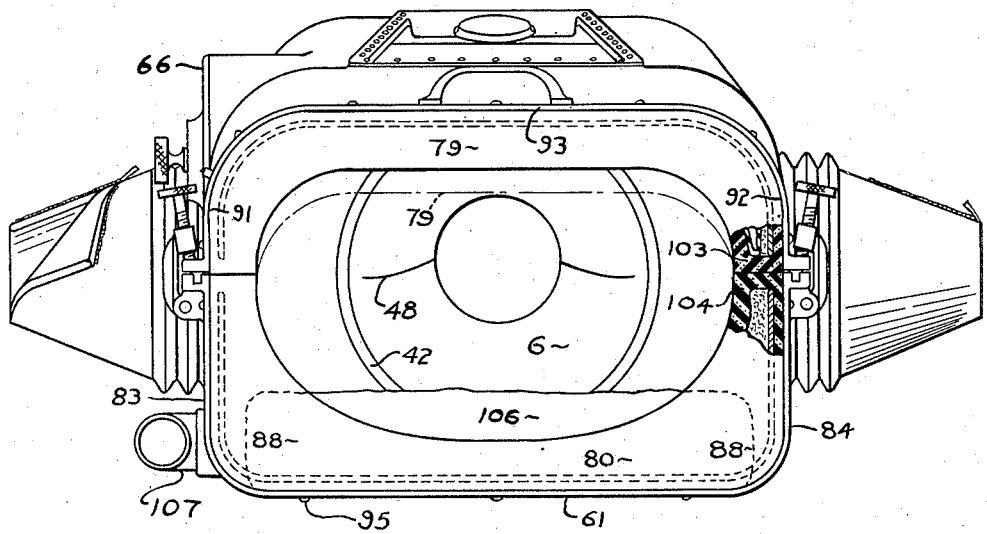
Fig. 7 is a bottom end view, partly in section and with parts removed, of the body-enclosing unit of the respirator showing the resilient cushioning means for effecting a seal around the waist of a person wearing the device.
Figure 8:
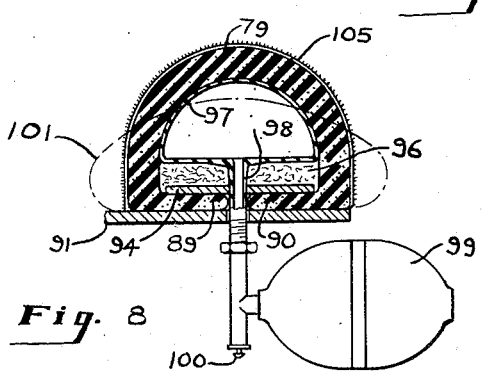
Fig. 8 is a detail view in section showing the resilient cushion for effecting a seal around the waist of a person wearing the cuirass and taken substantially on the line 8—8 of Fig. 3, being enlarged with respect thereto.

The front half 2 of the casing or cabinet is arched in the region which normally overlies the chest of the patient and is provided with a transparent window 59 in which is set a gauge 60 for measuring the degrees of vacuum or pressure within the cabinet. Back side 61 of the rear half 3 is substantially flat and straight (Figs. 3 and 7). At the bottom of the cabinet or casing the ends 4 and 5 of the casing halves are set at an obtuse angle with respect to the back side 61 of the rear half 3 so that lower front portion 62 of front half 2 overhangs the bottom rear marginal edge 63 of rear half 3 as shown in Fig. 3. The top end of the respirator cabinet defined by flanges 43 and 44 of the neck opening is set at an acute angle with the back side 61 as shown in Fig. 3. This arrangement in which the bottom end of the cabinet is set at an obtuse angle and the top end of the cabinet is set at an acute angle with respect to the rear side of the cabinet makes the cabinet more comfortable to wear so that the patient is at greater ease while undergoing treatment.

At one side of the casing or cabinet is a hand hole or port 64 through which an attendant may reach for the purpose of attending the patient and applying medicaments such as camphorated oil and the like. As shown in Fig. 3, this hand hole is preferably formed in front half 2 of the casing and is substantially circular. Normally the hand hole is closed by a cover 65 (Fig. 5) which fits within the hand hole and has a peripheral marginal flange 66 which overlies marginal edge portions of the hole. A seal is effected between the cover and hole by means of an annular compressible gasket 67 received in an annular groove 68 formed in the periphery of the cover 65 and opening radially outward. A plurality of radially disposed bars 69 are slidingly mounted in the cover 65 and have their outer ends in bearing engagement against a split ring 70 underlying the gasket 67 in the groove 68. The slide bars 69 are forced radially outward to distend the split ring 70 and urge the gasket 67 against the walls of the opening or hand hole 64 by means of a wedge block 71 carried in a recess 72 formed in the central part of the inside of the cover. Each of the slide bars 69 bears against an inclined surface 73 forming the bottom of a groove in the wedge block 71. The wedge block is drawn to the left, as viewed in Fig. 5, to force the slide bars 69 outwardly by means of a stud 74 which has threaded engagement with the wedge block and carries a knurled hand wheel 75 on the outside of the cover. The shoulder 76 on the hand wheel bears against marginal portions of the cover around the aperture through which the stud 74 extends. To remove the cover from the hand hole the hand wheel 75 is turned so as to rotate the stud 74 so that the wedge block 71 moves to the right as viewed in Fig. 5. The inherent resiliency of the split ring 70, preferably formed of a material such as brass or steel, causes it to contract, moving the slide bars 69 radially inward and contracting the gasket 67 so that the frictional grip on the walls of the opening 64 is released and the cover can be removed therefrom. To replace the cover the process is repeated in reverse order and the hand wheel 75 tightened sufficiently to hold the gasket 67 against the walls of the opening 64 with sufficient frictional force to retain the cover in place against the internal pressure in the cabinet or casing during the alternations of pressure produced by the pump to be later described.

Figure 9:
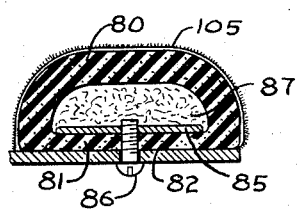
Fig. 9 is a sectional detail similar to Fig. 8, taken substantially on the line 9—9 of Fig. 3 and enlarged with respect thereto.
Figure 10:
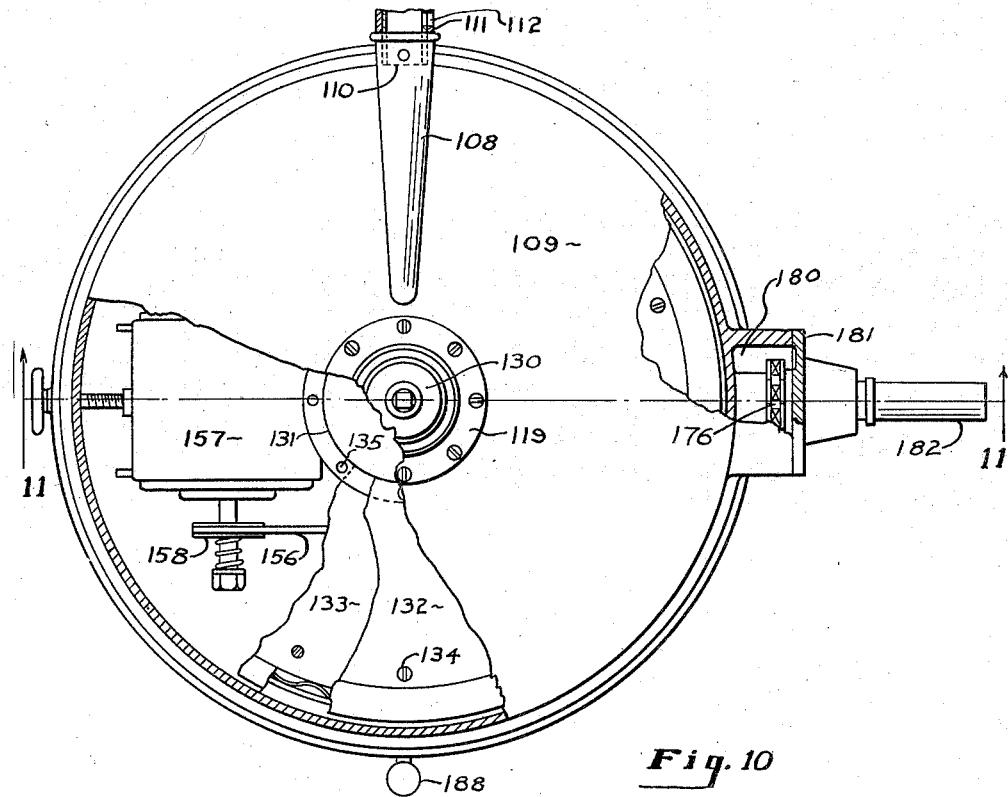
Fig. 10 is a top or plan view partly in section and with parts removed showing the construction of the air actuator or pump.

Around the waist of a patient a seal is effected by means of a pair of C-shaped cushions 79 and 80. The cushion 80 extends around the inside of the bottom end 5 of the rear casing 3. As shown in Fig. 9, the cushion is preferably formed of sponge rubber rolled into a tube and having marginal edges 81 and 82 disposed in substantially abutting arrangement with one another and held against right and left side walls 83 and 84 respectively and back wall 61 of the rear casing 3 by means of a plate 85 which is secured in place by a plurality of screws 86 extending through apertures in the casing 3 and threadedly received by the plate 85. The space between the holding plate 85 and the opposed inner surface of the sponge rubber cushion 80 is filled with a suitable yielding packing material 87 such as a substance commonly known in the trade as kapok. Corner portions 88 of the cushion 80 are of greater thickness or depth than side and rear portions, so that the body-contacting surface of the cushion will substantially conform to the contour of a person's torso. Thus, the surface of the cushion 80 is substantially semiovate or elliptical, while the side and rear walls of the casing half 3 are set at substantially right angles with respect to one another.

The cushion 79 is also preferably formed of sponge rubber shaped in the form of a tube and having marginal edges 89 and 90 abutting one another and disposed against the inside surfaces of right and left side walls 91 and 92 respectively and lower front wall 62 of the front casing half 2 at the bottom edge thereof. The marginal edges 89 and 90 of the sponge rubber cushion are secured in place by a plate 94 similar to the plate 85 for the cushion 80 and also held in place by a series of screws 95. A layer 96 of yielding material such as kapok overlies the plate 94 and an inflatable tube or bag 97 is disposed in the space between the yieldable layer 96 and the inner surface of the sponge rubber cushion 79. An inflating stem or conduit 98 extends from the tube 97 through the kapok layer 96, holding plate 94, and casing side wall 91. Suitable valve insides (not shown) are fitted in the stem 98 so that the tube 97 may be inflated by a suitable means such as a hand bulb 99 which is attached to the stem 98 in any suitable fashion. A pin 100 is arranged in the inflating mechanism so as to depress the valve insides and release the air from the tube 97 when desired, in accordance with well known usage. The cushions 79 and 80 are sealed by end pieces 103 and 104 respectively of folded-over sponge rubber which abut one another substantially at the parting lines 10 of the cuirass. Preferably the cushions 79 and 80 are covered with a fibrous material such as closely shorn lambs' skin 105 which may be secured in place by having marginal edges thereof tucked between the casing walls and holding plates 85 and 94.

Against the back wall 61 of the rear casing half 3 is disposed a cushion 106 which may be formed of a suitable yielding material such as curled hair enclosed in a suitable covering material such as canvas or drill. This cushion serves as a mattress for the patient to recline upon and may be adjusted to different heights by suitable pads (not shown) so as to adapt the respirator cabinet or casing for persons of different size.

Figure 11:
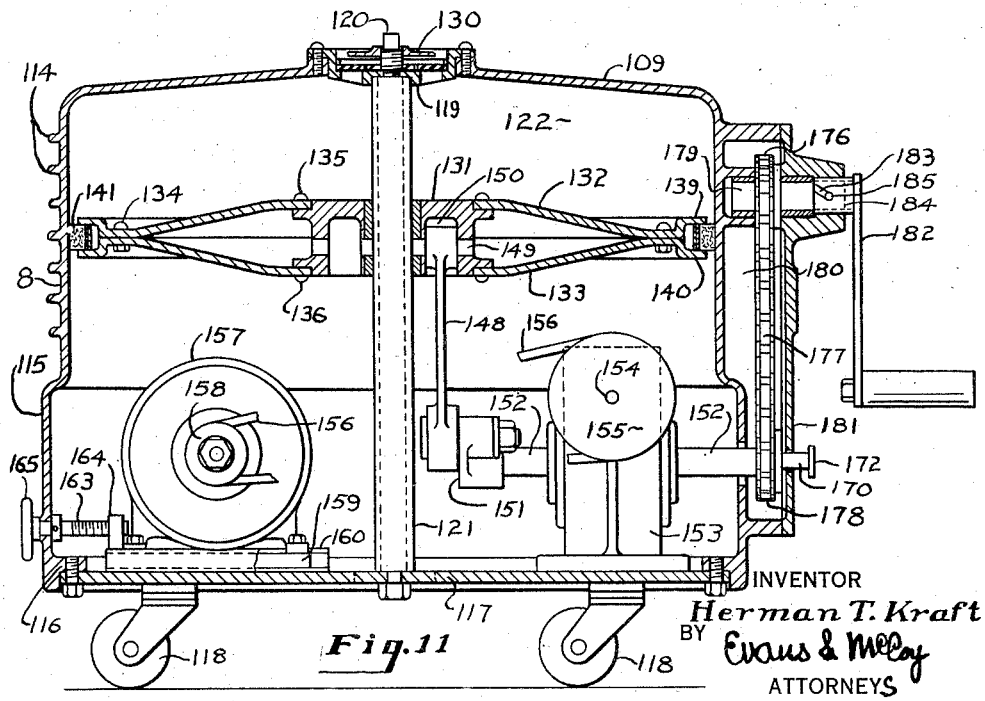
Fig. 11 is a vertical sectional view with parts removed showing the pump construction and taken substantially on the line 11—11 of Fig. 10.

The hose 9 is connected to the body cabinet or casing by means of an elbow fitting 107. The opposite end of the hose is connected to an outlet 108 formed into top end 109 of the air pump. A tube 110 is fitted into the outlet 108 and the conduit 9 is embraced by a rotatable sleeve 111. Radially aligned holes 112 are formed in the tube 110 and sleeve 111 and by rotation of the sleeve on the tube the effective area of the holes may be adjusted to regulate the passage of air into and out of the system at this point. The top end 109 of the pump may be formed integrally with the cylindrical shell 8 as shown in Fig. 11. Bottom portion 115 of the shell is of increased diameter and its lower marginal edge is thickened and has an inwardly directed, substantially circumferential flange 116 which is secured on a platform 117 mounted on casters 118. Desirably the shell 8 and top 109 may be made of a light metal such as aluminum and its alloys. A multiplicity of annular reinforcing ribs 119 are formed about the upper cylindrical portion of the shell to reinforce the latter.

In the center of the top 109 is a circular opening in which is secured a valve member 119. A vertically disposed stud 120 passes through a central aperture in the valve member 119 and threadedly secures a tubular or hollow guide member or post 121 which extends vertically through the center of pumping chamber 122 within the cylindrical shell 8 and has its lower end secured to a central portion of the platform 117. A circle of cored valve openings 123 are formed through the valve member 119 being spaced substantially equidistant from the stud 120.

The top of the valve member 119 is recessed as indicated at 124 and the bottom of the recess in which are the valve openings 123 is substantially flat to carry a flexible valve consisting of a plurality of flaps 125 which overlie the valve openings 123 and which extend radially inward from a circular band 126 formed of the material of the flaps. Preferably, the flaps and band are integrally formed of a suitable rubber composition. One method of making the valve flaps is to cut a number of slits 127 in radial directions extending outwardly from inner marginal edge 128 of a circular washer of relatively thin rubber composition.

Figures 15, 16:
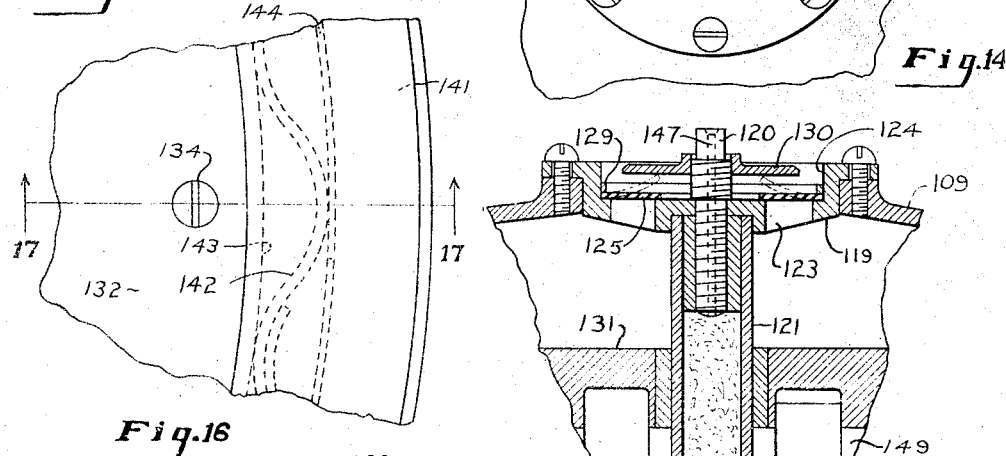
Fig. 15 is a sectional detail with parts removed showing the pump valve of Fig. 14 and taken substantially on the line 15—15 thereof.
Fig. 16 is a plan view of a fragment of the reciprocating piston of the air pump showing the resilient sealing ring.
Figure 17:
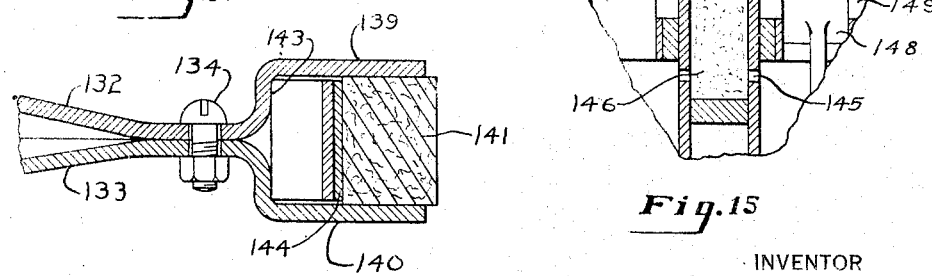
Fig. 17 is a sectional detail taken substantially on the line 17—17 of Fig. 16.

The outer marginal edge of the rubber washer which forms the annular band 126 is retained in place within the recess 124 by a metallic ring 129 which has a spring fit within the recess or may be otherwise secured therein. The bottom surface of the recess 124 upon which the flaps 125 rest is finished around the openings 123 so that the flaps normally seal the latter to prevent the flow of air therethrough into the pump chamber 122. Upon an increase in pressure within the pump chamber above that of the atmosphere the flaps 125 are elevated such as to the broken line position illustrated in Fig. 15 and air flows out of the chamber through the openings 123. In order to limit the upward movement of the flaps 125 and in a measure control the flow of air out of the pump chamber, a circular adjusting disk 130 is threadedly mounted upon the stud 120 so that it may be supported in various elevated positions above the flaps 125. By screwing the disk 130 downwardly on the stud 120 so as to closely overlie the valve flaps, the upward movement of the latter is restricted and the amount of air which can escape from the pump chamber is restricted. Raising of the disk 130 permits greater freedom in the upward movement of the flaps so that relatively larger quantities of air can escape from the pump chamber during the operation of the pump.

Slidably mounted on the guide post 121 is a piston comprising a central substantially circular bearing member 131 to which are secured top and bottom disks 132 and 133 respectively. The disks 132 and 133 are dished or conical in shape, being secured together adjacent their outer peripheries as indicated at 134 and having their central portions spaced apart and secured to the top and bottom of the slidable bearing member 131 as indicated at 135 and 136 respectively. The outer margins 139 and 140 of the disks 132 and 133 respectively are disposed in spaced apart, parallel relation and receive therebetween a circumferential packing ring 141 formed of a suitable resilient yieldable material such as felt. The diameter of the disks 132 and 133 is substantially equal to the free inside diameter of the shell 8, being slightly less for the purpose of clearance. A seal is effected between the shell 8 and the piston by means of the packing ring 141 which is urged radially outward by a wavy leaf spring 142 confined between the edge portions or flanges 139 and 140 and between shoulders 143 of the disk and a split ring 144 which backs up the packing ring 141. As shown in Fig. 11, the slidable bearing member 131 of the piston has engagement with the guide post 121 over a greater distance in the direction of axial movement of the piston than the edge portion or packing ring 141 of the piston has with the shell 8. Accordingly, the piston is effectively guided during reciprocation with minimum binding at its periphery between the packing 141 and the shell.

The piston is arranged for vertical reciprocating movement in the pump chamber 122, being held against rotation and guided by the post or member 121 which has sliding engagement with the central member 131. Lubrication of the piston and the member 131 is effected through holes 145 in the guide post 121. These holes communicate with the interior of the post, which is filled with absorbent material 146 such as cotton waste and retains a quantity of oil which is released through the holes 145. The oil is replenished as necessary through a bore 147 in the stud 120.

Reciprocatory movement is imparted to the piston by means of a connecting rod 148 pivotally mounted by means of a pin 149 in a recess 150 within the central member 131 of the piston and adjacent the aperture therein which receives the guide member 121. The lower end of the connecting rod 148 is carried by the free end of a connecting rod 151 secured on a driven shaft 152 journalled in a speed-reducing gear box, indicated at 153, which may be of conventional construction. Power intake shaft 154 of the speed-reducing gear box has secured thereon a pulley 155 actuated by a V-belt 156 driven by an electric motor 157 through an adjustable size split pulley 158.

The motor 157 is secured to a carriage 159 slidably mounted on guides 160 secured to the platform 117. A threaded shaft 163, received in an upward extension 164 of the carriage 159, passes through bottom portion 115 of the pump casing and has secured thereon a hand wheel 165 by means of which the shaft may be rotated to slide the motor carriage on the guides 160, thus varying the distance between the motor shaft and the power intake shaft 154 of the speed-reducing gear box. This movement of the motor varies the effective diameter of the split pulley 158 so that the speed of rotation of the driven shaft 152 may be regulated as desired.

Figure 12:
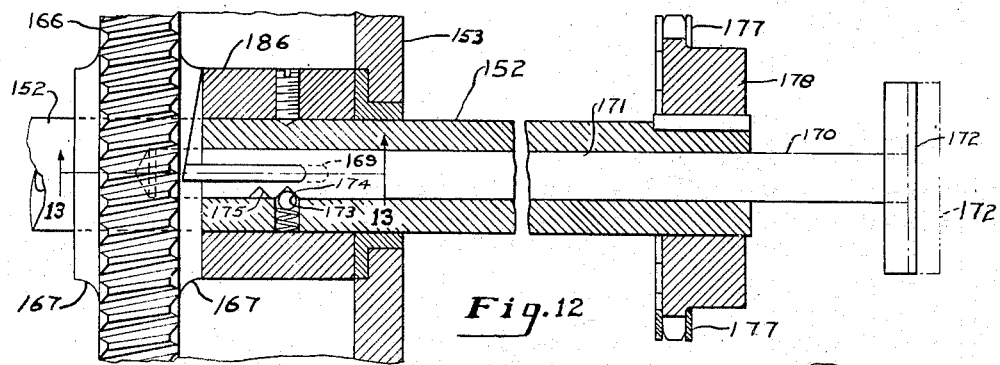
Fig. 12 is a detail view in section and with parts removed showing the clutch means for controlling the manual or motor drive of the pump.
Figures 13, 14:
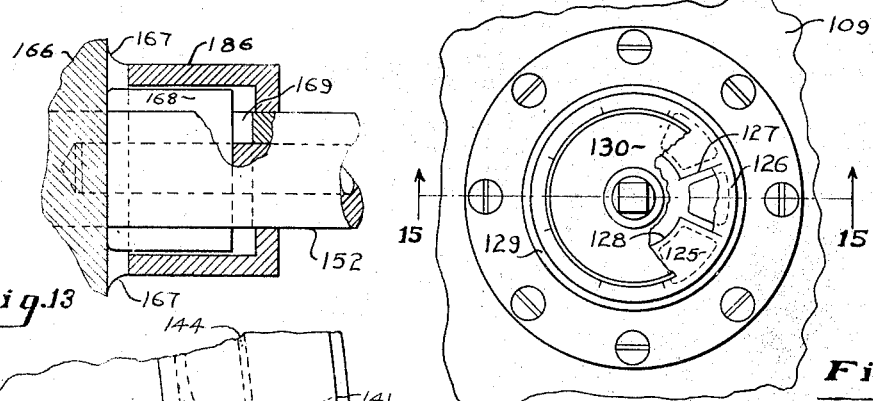
Fig. 13 is a detail view partly in section showing the clutch teeth of the mechanism of Fig. 12 and taken substantially on the line 13—13 thereof.
Fig. 14 is a detail plan view of the respirator exhaust valve partly in section and with parts removed.

The train of speed-reducing gears in the gear box 153 drives a gear 166 rotatably carried within the gear box on driven shaft 152. A pair of substantially diametrically arranged shoulders 167 is formed on one end of the hub of the gear 166 to engage a shiftable key 168 which extends through a transverse slot 169 formed in the driven shaft 152. The slot 169 is of greater axial length than the key 168 so that the latter may be moved in the slot so as to be released by the shoulders 167 of the gear 166 and interrupt the driving connection between the gear and the driven shaft 152. The shiftable key 168 is controlled by a rod member 170 slidable in an axial bore 171 formed in a portion of the shaft 152 which is opposite the end thereof carrying the crank 151 and which projects through the lower portion 115 of the casing on the opposite side of the latter from the speed adjusting hand wheel 165. The inner end of the rod 170 has a transverse slot formed therein which receives the key 168, the latter preferably having a press fit therein to prevent it from becoming dislodged. By means of a handle 172 formed on the projecting end of the rod 170 the latter may be moved longitudinally within the bore 171 of the driven shaft 152 so as to move the key 168 into and out of engagement with the shoulders 167 of the gear 166. A spring-pressed detent 173 engages a notch 174 in the rod 170 to retain the latter substantially in the full line position shown in Fig. 12 in which the key 168 is engaged by the gear shoulders 167. Upon moving the rod 170 to the broken line position illustrated in Fig. 12, in which the shoulders 167 are disengaged from the key 168, the detent 173 engages a notch 175 in the rod 170 to hold the clutch mechanism disengaged. A sprocket 178 is keyed on the driven shaft 152 and carries a chain 177 trained over a sprocket 176 secured on a stub shaft 179 journalled in a housing 180 formed on the outside of the casing 8. A cover 181 is provided for the housing 180 and also serves to journal the stub shaft 179. A crank 182 has a bayonet slot 183 formed in its hub 184 which engages a transverse pin 185 secured in the stub shaft 179.

The crank 182 is removable from the stub shaft 179 and in normal operation of the pumping apparatus the piston is reciprocated within the shell 8 by means of the motor 157 operating through the reduction gearing 153 and clutch key 168. If for any reason the power source should fail so that the motor 157 could not operate the mechanism, the reciprocation of the piston can be effected by the crank 182, in which case the rod 170 is moved to the broken line position shown in Fig. 12 to disengage the key 168 from the gear 166. This arrangement is also advantageous when moving a patient from one place to another when it is inconvenient or impossible to maintain a power connection to the motor 157. The changeover from manual operation of the pump to motor operation, or from motor operation to manual operation, may be effected without substantial interruption in the operating cycle of the pump, so that the patient's respiration induced thereby need not be interrupted.

As shown in Fig. 1, the pump is provided with a handle 188 pivoted at 189 to a bracket 190 secured to the under side of the platform 117. When the handle is in an upright position a projection 191 is arranged to engage the floor upon which the pump is supported to act as a brake and prevent movement of the pump on the casters 118. The projecting portion 191 of the handle becomes disengaged from the floor when the handle 188 is moved away from the pump shell 8 for moving the pump about.

Figure 18:
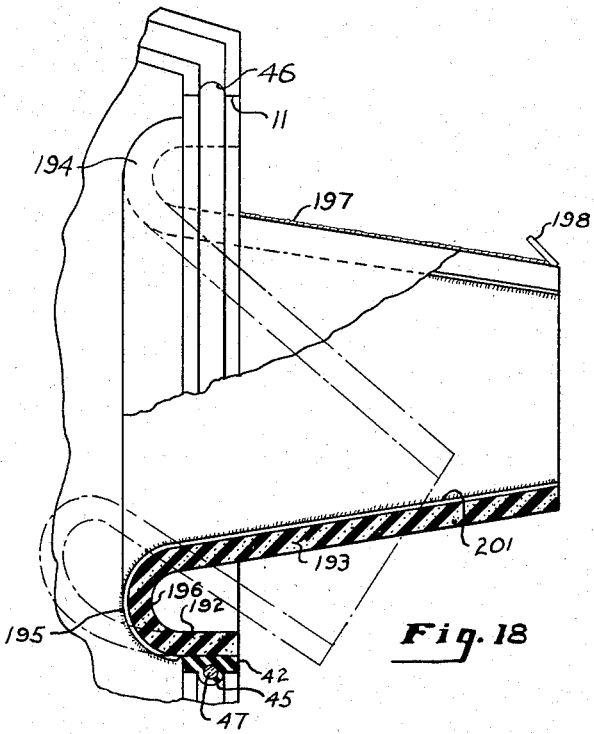
Fig. 18 is a fragmentary detail partly in section and with parts removed illustrating a modified form of arm embracing sleeve for the cabinet.

The modified construction of sleeve for effecting a substantially air-tight seal between the body enclosing casing and the arm of a patient is illustrated in Fig. 18. The arm embracing sleeve shown in Fig. 18 is of particular advantage where the patient wishes to assume a sitting posture while wearing one of the cabinet respirators of the present invention. As shown by the broken lines of Fig. 18 the inner band 193 of the sleeve may be deflected downwardly so that the patient's arm may assume a position substantially along the patient's side, which is more comfortable than having his arms outstretched. The annular holding band 42 is received in the cylindrical arm hole opening 11 and retained in position by a bead 45 received in the annular groove or rabbet 46 formed in the walls of the cylindrical arm hole opening 11. As previously mentioned, the annular holding ring or band 42 is preferably formed of a relatively stiff rubber and may be reinforced by a circular rod or wire 47. A seal around the patient's arm is effected by a sleeve preferably formed of relatively soft, resilient material such as sponge rubber. This sleeve has an outer annular band portion 192 which is secured at 193 to the inwardly directed substantially cylindrical surface of the holding band 42 by vulcanization or cement. Extending through and normally concentric with respect to the outer band 192 is an inner tapering or frustoconical band 193 which is the portion of the sleeve which embraces the patient's arm. The large diameter end of the inner band 193 is circumferentially secured to the outer band 192 by an annular radial grooved connecting ring or band 194. This connecting band has a convex side 195 which is directed toward the interior of the body enclosing cabinet and a concave side 196 which is outwardly directed and forms the bottom of a circular channel between the outer and inner bands 192 and 193 respectively.

The conical inner band 193 has a longitudinally extending slot inwardly from the small diameter end thereof, the sides of which slot are provided with fasteners 197 adapted to be progressively drawn together and secured by a slide fastener 198 in a manner similar to the operation of the slide fasteners 33 and 34 previously described in connection with the sleeves illustrated in Figs. 2, 3 and 7.

Figure 19:
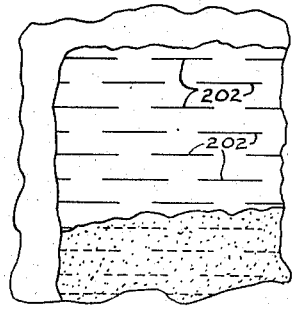
Fig. 19 is a fragmentary detail with parts broken away showing the manner in which the lamb's skin covering for the collars and sleeves of the respirator may be provided with slits to permit stretching thereof.
Figure 20:
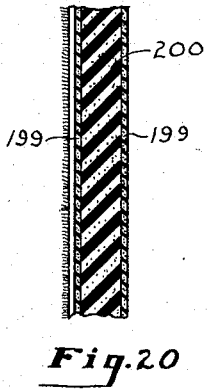
Fig. 20 is a fragmentary diagrammatic detail in section showing the sponge rubber employed in the collars and cuffs together with the lamb's skin lining therefor.

The sponge rubber employed in the arm and neck sealing devices of the present invention is preferably formed with surface skin 199 (Fig. 20) such surface skin being relatively free from openings as compared with interior portions 200 of the sponge rubber and restricts the absorption of liquid and other excrements from the patient wearing the respirator cabinet. The inner or flesh-contacting surface of the sleeve shown in Fig. 18 may be covered with closely shorn lamb's skin 201 or the like. This lamb's skin is similar to that described in connection with the previous figures. Where it is desirable that the lamb's skin be adapted for slight stretching when the sleeves and collars are drawn tightly about the patient's arms and neck by the slide fasteners 34, 50 and 198, it is preferably provided with a multiplicity of relatively short discontinuous and overlapping slots 202 (Fig. 19).

Figure 21:
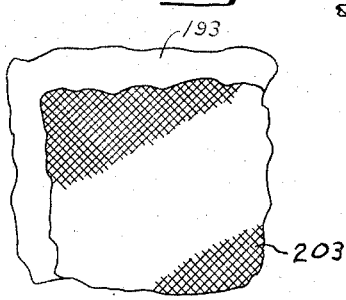
Fig. 21 is a fragmentary detail diagrammatically illustrating a fabric lining for the collars and cuffs.

As an alternative for the lamb's skin, in the construction of the sleeves and collars for respirators of the character contemplated by the present invention, a coating or covering layer of cloth, such as used in gauze bandage material 203 (Fig. 21) may be employed. The individual threads of this cloth preferably are arranged to extend in oblique or diagonal directions around the inside surfaces of the collars and cuffs or sleeves so as to permit slight stretching or elongation of these parts, similarly to the manner in which the slots 202 permit stretching or elongation of the lamb's skin. Both the lamb's skin and the cloth 203 may be secured to the sponge rubber in any suitable manner such as by rubber cement and the like, or it may be formed in removable lining which can be replaced as desired upon becoming worn or soiled.

Figure 22:
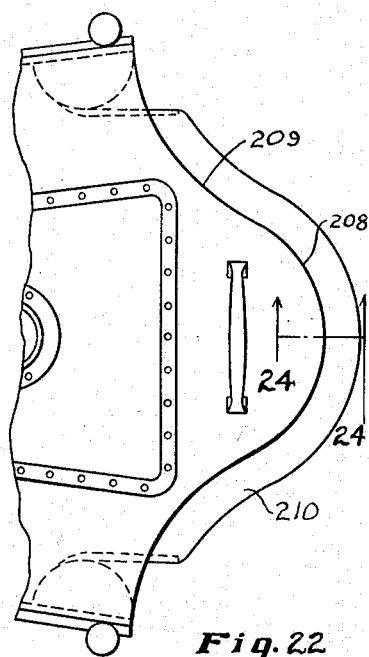
Fig. 22 is a fragmentary detail of the bottom end of a modified form of body enclosing respirator cabinet.
Figure 23:
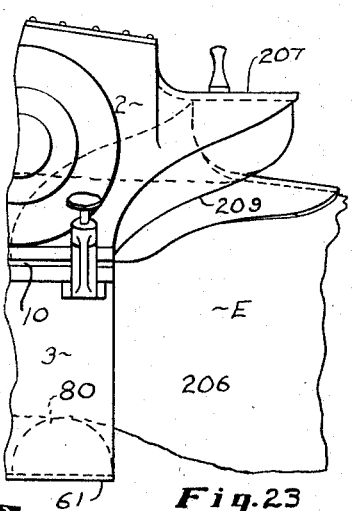
Fig. 23 is a fragmentary side elevational view of the bottom end of the modified respirator cabinet shown in Fig. 22.
Figure 24:
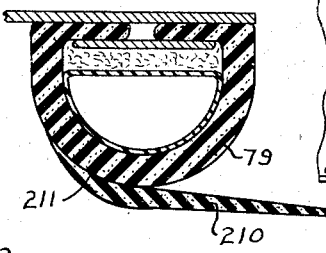
Fig. 24 is a detail view in section showing the sealing cushion and apron of the cabinet illustrated in Fig. 22 and taken substantially on the line 24—24 of that figure.

In Figs. 22 through 24 is illustrated a modification in the construction of the lower ends of the body enclosing cabinet of the respirator.

In this construction rear half 3 of the cabinet is made of a length such that cushion 80 engages the small of the patient's back and bottom side edges 206 of the rear half of the casing are substantially at right angles with respect to back side 61 and are spaced a short distance toward the head of the patient from the patient's hip bone E. The lower end of the front half of the casing 2 is formed with an extension 207 which overhangs or extends beyond the bottom edge of the back side 61 and terminates in a convex marginal edge 208. The extension portion 207 is arranged to overlie the lower part of the patient's abdomen and the convex edge 208 merges into concave edges 209 which curve downwardly toward the parting line 10 of the cabinet and are arranged to overlie the patient's groin. This novel formation of the bottom end of the respirator cabinet permits the patient to assume a sitting posture while wearing the respirator, in which he bends at the hips and is permitted to assume a more comfortable attitude than would be possible if the respirator required that the patient recline at all times.

Desirably, an apron 210 is secured to the cushion 79 and has a marginal edge contour something like that of the extension portion 207 of the front half of the casing 2 as illustrated in Fig. 22. The apron 210 may be formed of sponge rubber having surface skin corresponding to the surface skin 199 previously described, and may be secured to the cushion 79 at 211 by vulcanization or cement.

Furthermore, it is to be understood that the particular form of apparatus shown and described, and the particular procedure set forth, are presented for purposes of explanation and illustration and that various modifications of said apparatus and procedure can be made without departing from my invention.

What I claim is:

1. A device for enclosing and effecting a seal with an appendage of a person comprising a sleeve having a bellows portion of alternately increasing and decreasing cross sectional area and a flexible tapering portion for closely embracing the appendage, the tapering portion having a substantially longitudinally extending slit, and means for progressively drawing together and fastening the edges of the slit.

2. A device for enclosing and effecting a seal with an appendage of a person comprising a sleeve having a bellows portion of alternately increasing and decreasing cross sectional area and a flexible tapering portion for closely embracing the appendage, the bellows portion being formed of relatively dense rubber and the tapering portion being formed of sponge rubber, a longitudinally extending slit in the tapering portion of the sleeve and means for progressively drawing together and fastening the edges of the slit.

3. A device for enclosing and effecting a seal with an appendage of a person comprising a sleeve having a bellows portion of alternately increasing and decreasing cross sectional area and a flexible tapering portion for closely embracing the appendage, the bellows portion being formed of a relatively dense rubber and the tapering portion being formed of sponge rubber, an integral surface skin formed on the sponge rubber of the tapering portion to retard the absorption of liquid thereby, a longitudinally extending slit in the tapering portion of the sleeve and means for progressively drawing together and fastening the edges of the slit.

4. In therapeutic apparatus, a sealing device comprising a tubular sleeve having a bellows portion of alternately increasing and decreasing cross sectional area and a flexible, tapering, portion extending as a continuation of the bellows portion for closely surrounding the limb of a patient.

5. In therapeutic apparatus, a sealing device comprising a tubular sleeve having a solid rubber bellows portion of alternately increasing and decreasing cross sectional area and a flexible, tapering, sponge rubber portion extending as a continuation of the bellows portion for closely surrounding the limb of a patient.

6. In therapeutic apparatus, a sealing device comprising a tubular sleeve having a flexible bellows portion, a relatively stiff holding band on one end of the bellows portion for attaching the device to a casing, and a relatively soft tapering portion on the other end of the bellows portion and extending as a continuation thereof for closely surrounding the limb of a patient.

7. In therapeutic apparatus, a sealing device comprising a tubular sleeve having a flexible bellows portion, a relatively stiff holding band on one end of the bellows portion for attaching the device to a casing, a reinforcing element of rigid material embedded in the holding band to resist collapse of the band, and a relatively soft tapering portion on the other end of the bellows portion and extending as a continuation thereof for closely surrounding the limb of a patient.

8. In therapeutic apparatus, a sealing device comprising a tubular sleeve having a bellows portion of alternately increasing and decreasing cross sectional area and a flexible, tapering portion extending as a continuation of the bellows portion for closely surrounding the limb of a patient, and a slit in the tapering portion only to allow expansion of the same in passing the patient's limb therethrough.

9. In therapeutic apparatus, a casing having an opening therein for a patient's neck or limb and an annular groove formed in the walls of the opening, a sealing device comprising a rubber sleeve of tapered form, a holding ring of rubber harder than that of the sleeve secured to the large end of the sleeve and disposer within the opening, an integral circumferentially extending rib on the holding ring and seated in the annular groove to hold the sealing device in the opening, and a circumferentially extending metal ring embedded within the bead of the holding ring to reinforce the latter and retain the bead within the groove.

10. In therapeutical apparatus, a relatively rigid casing having means providing an opening for the neck or limb of a patient, a sealing device for the opening comprising a flexible and resilient shape retaining tube having at one end a relatively stiff resilient ring disposed within the opening and circumferentially embraced by said means, said ring normally being slightly larger than the opening whereby the ring is radially compressed by said means to form an air seal between the casing and the tube by the inherent resiliency of the latter, and interfitting formations on said means and said ring to retain the latter in position.

11. Therapeutic apparatus comprising a casing having relatively rigid means defining an opening therein, a sealing member of resilient flexible material for embracing the limb of a patient, said member having a portion embraced by the rigid means and having interfitting engagement therewith to locate the sealing member in predetermined position in the opening, and a stiff reinforcing element embedded in the embraced portion of the sealing member to retain the shape thereof and hold the same in intimate engagement with said rigid means.

12. In therapeutic apparatus, a relatively rigid casing and a sealing cushion for an edge of the casing, said cushion including a relatively soft and deformable rubber member formed with an internal chamber, fibrous packing material in the chamber to prevent collapse of the member, a rigid element disposed in the cushion between the packing material and the casing, and means connecting the element and the casing to retain the cushion in position along said edge.

13. In therapeutic apparatus, a relatively rigid casing and a sealing cushion for an edge of the casing, said cushion including a relatively soft and deformable rubber member formed with an internal chamber, fibrous packing material in the chamber to prevent collapse of the member, a rigid element disposed in the cushion between the packing material and the casing, means connecting the element and the casing to retain the cushion in position along said edge, and means disposed in said chamber to receive and retain air for inflating the cushion.

14. In therapeutical apparatus, casing means for overlying a patient's chest to provide an air chamber, air pump means actuable to alternately compress and expand air, means connecting the casing means and the pump means to create alternations of pressure and vacuum in said chamber whereby breathing is induced in the patient, and a valve for regulating the air flow in the apparatus, said valve including means substantially preventing the admission of air to the apparatus therethrough during said air expansion while allowing the discharge of air from the apparatus during said air compression, and adjustable means having connection with said valve means to regulate the quantity of air discharged during each period of compression.

15. In therapeutical apparatus, a relatively rigid cuirass for overlying the front of a patient's body, an elongated hollow cushion of deformable material secured along the bottom edge of the cuirass, means for inflating the cushion, and a flexible and resilient apron of self-sustaining stiffness secured to the cushion along a line spaced from the cuirass, said apron being wholly supported by the cushion and extending therefrom in position to lie flatly against the lower part of the patient's body.

16. In therapeutical apparatus, a relatively rigid cuirass for overlying the front of a patient's body, an elongated hollow cushion of deformable and resilient material secured along the bottom edge of the cuirass and having an air chamber therein, and a flexible and resilient apron of self-sustaining stiffness secured to the cushion along a line spaced from the cuirass, said apron being wholly supported by the cushion and extending therefrom in position to lie flatly against the lower part of the patient's body.

17. Therapeutic apparatus comprising in combination a torso enclosing casing having an opening for the neck of a patient and an adjustable rest for the head of the patient, said rest including an element of flexible sheet material, a pair of spaced members having connection with the ends of said sheet material to suspend the same therebetween, and means attached to the casing and having connection with said members to support the latter on the casing, said supporting means being adjustable to move the suspending members toward and away from one another to vary the shape and the position of the flexible sheet element relative to the casing opening.

HERMAN T. KRAFT.